United States Patent
Du et al.

(10) Patent No.: US 11,334,973 B2
(45) Date of Patent: May 17, 2022

(54) IMAGE COLORIZING METHOD AND DEVICE

(71) Applicant: BOE TECHNOLOGY GROUP CO., LTD., Beijing (CN)

(72) Inventors: Kangning Du, Beijing (CN); Xiangxiang Zou, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 544 days.

(21) Appl. No.: 16/339,592

(22) PCT Filed: Sep. 13, 2018

(86) PCT No.: PCT/CN2018/105438
§ 371 (c)(1),
(2) Date: Apr. 4, 2019

(87) PCT Pub. No.: WO2019/153741
PCT Pub. Date: Aug. 15, 2019

(65) Prior Publication Data
US 2021/0366087 A1 Nov. 25, 2021

(30) Foreign Application Priority Data
Feb. 7, 2018 (CN) .......................... 201810123237.7

(51) Int. Cl.
*G06T 5/50* (2006.01)
*G06N 3/08* (2006.01)
(Continued)

(52) U.S. Cl.
CPC ................ *G06T 5/50* (2013.01); *G06N 3/08* (2013.01); *G06V 40/10* (2022.01); *G06V 40/161* (2022.01);
(Continued)

(58) Field of Classification Search
CPC .. G06T 5/50; G06K 9/00228; G06K 9/00288; G06K 9/00362; G06N 3/08
See application file for complete search history.

(56) References Cited

U.S. PATENT DOCUMENTS

| 7,092,566 B2 | 8/2006 | Krumm | |
|---|---|---|---|
| 2004/0179719 A1* | 9/2004 | Chen | G06K 9/00234 382/118 |

(Continued)

FOREIGN PATENT DOCUMENTS

| CN | 101477695 | 7/2009 |
|---|---|---|
| CN | 101667299 A | 3/2010 |

(Continued)

OTHER PUBLICATIONS

Deshpande et al, "Learning Diverse Image Colorization", CVPR, 2017 (Year: 2017).*

(Continued)

*Primary Examiner* — Ruiping Li
(74) *Attorney, Agent, or Firm* — Myers Bigel, P.A.

(57) ABSTRACT

An image colorizing method and device are provided, which relate to the field of image processing technology. The method includes acquiring a grayscale image to be colorized, classifying the grayscale image to determine the grayscale image is a human face image or a human image, providing the grayscale image to a neural network based image colorizing model corresponding to the type of the grayscale image to obtain color information for respective pixels in the grayscale image. The image colorizing model is a human face image colorizing model if the grayscale image is a human face image, the image colorizing model is a human image colorizing model if the grayscale image is a (Continued)

human image. The method further includes synthesizing the grayscale image and the color information to obtain a color image.

16 Claims, 3 Drawing Sheets

(51) Int. Cl.
*G06V 40/10* (2022.01)
*G06V 40/16* (2022.01)
(52) U.S. Cl.
CPC .. *G06V 40/172* (2022.01); *G06T 2207/20212* (2013.01); *G06T 2207/30242* (2013.01)

(56) References Cited

U.S. PATENT DOCUMENTS

| | | |
|---|---|---|
| 2010/0245928 A1 | 9/2010 | Zhao et al. |
| 2017/0004378 A1 | 1/2017 | Yu |

FOREIGN PATENT DOCUMENTS

| | | |
|---|---|---|
| CN | 102547063 A | 7/2012 |
| CN | 103489161 | 1/2014 |
| CN | 103839079 A | 6/2014 |
| CN | 106339680 A | 1/2017 |
| CN | 106855996 A | 6/2017 |
| CN | 107437081 A | 12/2017 |

OTHER PUBLICATIONS

Agrawal et al, "Exploring Convolutional Neural Networks for Automatic Image Colorization", 2016 (Year: 2016).*

First Office Action and English language translation, CN Application No. 201810123237.7, dated May 27, 2020, 20 pp.

Luo, Yuhong (2014). "Color Restoration Based on Similar Images" [Masters Thesis Submitted to Zhejiang Normal University]. Information Technology Series of Full-Text Databases of Chinese Excellent Masters Degree Thesis, No. 2, I138-995, Feb. 15, 2015] (39 pp with English language translation.).

International Search Report and Written Opinion of the International Searching Authority (with English language translation), International Application No. PCT/CN2018/105438, dated Nov. 28, 2018, 11 pp.

"Communication with Supplementary European Search Report", EP Application No. 18859977.3, dated Nov. 5, 2021, 10 pp.

Miori, Atsushi, et al., "Automatic Colorization of Near-Infrared Monochrome Face Image based on Position-Dependent Regression", Information Processing Society of Japan (IPSJ) SIG Technical Report, vol. 2013-CVIM-187, No. 34, May 30, 2013, 6 pp.

Pascual, Guillem , "Automatic Image Colorization", Treball final de grau (Final Degree Project), Universitat de Barcelona, Jun. 30, 2016, 61 pp. (retrieved Oct. 21, 2021 from the Internet: URL:https://core.ac.uk/download/pdf/78633741.pdf).

Zhang, Richard , et al., "Real-Time User-Guided Image Colorization With Learned Deep Priors", ACM Transactions on Graphics, vol. 36, No. 4, Article 119, Jul. 2017, 11 pp.

* cited by examiner

IMAGE COLORIZING METHOD AND DEVICE

CROSS REFERENCE TO RELATED APPLICATIONS

The present application is a 35 U.S.C. 371 national stage application of PCT International Application No. PCT/CN2018/105438, filed on Sep. 13, 2018, which claims the benefit of Chinese Patent Application No. 201810123237.7 filed to the Chinese Patent Office on Feb. 7, 2018, the contents of which are incorporated herein by reference in their entireties.

TECHNICAL FIELD

The present disclosure relates to the field of image processing technology, and in particular, to an image colorizing method and device.

BACKGROUND

With the development of mobile internet, people's requirements for image visual effects are also higher and higher. For example, in daily life, people always that a picture is clearer and colors thereof are more realistic. However, for technical reasons, older pictures are mostly black and white, so the visual effects of the black and white pictures are not comparable to those of color pictures. Therefore it is required to convert black and white pictures into color pictures.

SUMMARY

An embodiment of the disclosure provides an image colorizing method, which comprises acquiring a grayscale image to be colorized, classifying the grayscale image to determine a type of the grayscale image, the type of the grayscale image comprising a human face image or a human image, providing the grayscale image to a neural network based image colorizing model corresponding to the type of the grayscale image to obtain color information for respective pixels of the grayscale image, the image colorizing model comprising a human face image colorizing model corresponding to the human face image or a human image colorizing model corresponding to the human image, and synthesizing the grayscale image and the color information to obtain a color image.

In some embodiments, the step of classifying the grayscale image to determine a type of the grayscale image comprises: detecting a number and sizes of human faces contained in the grayscale image, determining that the grayscale image is the human face image if only one human face is present in the grayscale image and a proportion of the human face in the grayscale image exceeds a threshold value, and determining that the grayscale image is the human image if the proportion of the human face in the grayscale image does not exceed the threshold value or at least two human faces are present in the grayscale image.

In some embodiments, the step of synthesizing the grayscale image and the color information to obtain a color image comprises: synthesizing the grayscale image and the color information into a LAB color model image, and converting the LAB color model image into an RGB color model image.

In some embodiments, the image colorizing method further comprises establishing the human face image colorizing model or the human image colorizing model utilizing the grayscale image based on a deep learning technology.

In some embodiments, the step of establishing the human face image colorizing model utilizing the grayscale image based on a deep learning technology comprises: acquiring human face image samples, converting the human face image of the human face image samples from an RGB color model image into a LAB color model image, and training a deep convolutional generative adversarial network with all LAB color model images obtained by conversion to obtain the human face image colorizing model.

In some embodiments, the step of establishing the human face image colorizing model utilizing the grayscale image based on a deep learning technology further comprises normalizing the human face image of the human face image samples prior to converting the human face image of the human face image samples from an RGB color model image into a LAB color model image.

In some embodiments, the step of normalizing the human face image of the human face image samples comprises: locating key parts of the human face in the human face image, and normalizing a size of the human face image according to locations of the key parts, such that the key parts are located at set positions in a normalized human face image.

In some embodiments, all human face images of the human face image samples are those of the same human race.

In some embodiments, the step of establishing the human image colorizing model utilizing the grayscale image based on a deep learning technology comprises: acquiring human image samples, converting the human image of the human image samples from an RGB color model image into a LAB color model image, training a deep convolutional generative adversarial network with all LAB color model images obtained by conversion to obtain a primary training model, selecting first human image s from the human image samples to constitute retraining samples, a proportion of a first pixel in each first human image being higher than a first threshold, and a value of a first color component of the first pixel being higher than a second threshold, and retraining the primary training model with the retraining samples to obtain the human image colorizing model.

A further embodiment of the disclosure provides an image colorizing device comprising an acquisition module for acquiring a grayscale image to be colorized, a classification module for classifying the grayscale image to determine a type of the grayscale image, the type of the grayscale image comprising a human face image or a human image, a processing module for providing the grayscale image to a neural network based image colorizing model corresponding to the type of the grayscale image to obtain color information for respective pixels of the grayscale image, the image colorizing model comprising a human face image colorizing model corresponding to the human face image or a human image colorizing model corresponding to the human image, and a synthesis module for synthesizing the grayscale image and the color information to obtain a color image.

In some embodiments, the classification module is configured to: detect a number and sizes of human faces contained in the grayscale image, determine that the grayscale image is the human face image if only one human face is present in the grayscale image and a proportion of the human face in the grayscale image exceeds a threshold value, and determine that the grayscale image is the human image if the proportion of the human face in the grayscale image does not exceed the threshold value or at least two human faces are present in the grayscale image.

In some embodiments, the synthesis module is configured to synthesize the grayscale image and the color information into a LAB color model image, and convert the LAB color model image into an RGB color model image.

In some embodiments, the image colorizing device further comprises a training module configured to establish the human face image colorizing model or the human image colorizing model utilizing the grayscale image based on a deep learning technology.

In some embodiments, the training module is configured to receive human face image samples, convert the human face image of the human face image samples into a LAB color model image, and train a deep convolutional generative adversarial network with all LAB color model images obtained by conversion to obtain the human face image colorizing model.

In some embodiments, the training module is further configured to normalize the human face image of the human face image samples prior to converting the human face image of the human face image samples into a LAB color model image.

In some embodiments, the training module is further configured to locate key parts of the human face in the human face image, and normalize a size of the human face image according to locations of the key parts, such that the key parts are located at set positions in a normalized human face image.

In some embodiments, all human face images of the human face image samples are those of the same human race.

In some embodiments, the training module is configured to receive human image samples, convert the human image of the human image samples into a LAB color model image, train a deep convolutional generative adversarial network with all LAB color model images obtained by conversion to obtain a primary training model, select first human image s from the human image samples to constitute retraining samples, a proportion of a first pixel in each first human image being higher than a first threshold, and a value of a first color component of the first pixel being higher than a second threshold, and retrain the primary training model with the retraining samples to obtain the human image colorizing model.

In some embodiments, the threshold value is in a range of 1 to 5.

In the embodiments of the disclosure, image colorizing is accomplished by classifying a grayscale image to be colorized, providing it to a corresponding image colorizing model to obtain corresponding color information, and synthesizing the grayscale image and the color information to obtain a color image. Since different types of grayscale image differ greatly in the overall color and profile, different colorizing models are used for colorizing. Samples of the same type are used for training to establish a corresponding colorizing model, which reduces the complexity of the model and enhances the accuracy of the model, thereby accelerating the training speed for the model and the subsequent colorizing speed of the grayscale image. Furthermore, the color image obtained by colorizing is closer to a real image.

BRIEF DESCRIPTION OF DRAWINGS

In order to more clearly illustrate the technical solutions in embodiments of the disclosure, the accompanying drawings necessary for the description of the embodiments will be introduced briefly in the following. The drawings only represent some embodiments of the disclosure, and for the person having an ordinary skill in the art, other drawings may be obtained based on these drawings without undue effort.

DETAILED DESCRIPTION OF EMBODIMENTS

In the following, embodiments of the disclosure will be further described in detail in conjunction with the drawings in order to make the objects, technical solutions and advantages of the disclosure clearer.

Figure 1:
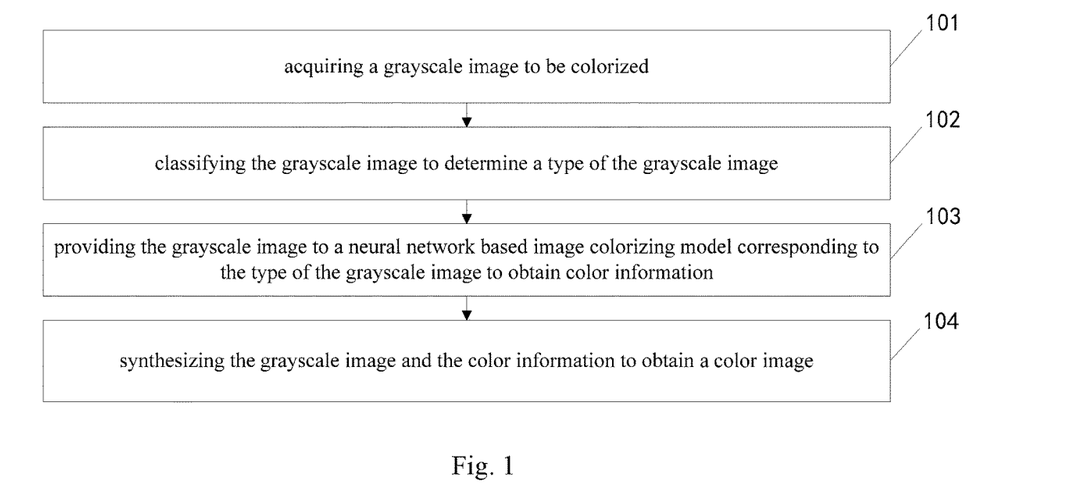
FIG. 1 is a flow chart of an image colorizing method provided by an embodiment of the disclosure.

FIG. 1 is a flow chart of an image colorizing method provided by an embodiment of the disclosure. Referring to FIG. 1, the image colorizing method includes the following steps.

Step 101, acquiring a grayscale image to be colorized.

The grayscale image in the embodiment of the disclosure may be an image originated from a black and white picture. Alternatively, it may be a grayscale image obtained in other ways, which will not be limited herein.

At step 102, classifying the grayscale image to determine the type of the grayscale image.

In particular, classification may be conducted according to the main portion of the grayscale image. For example, if the main portion of the image is a human face, it may be classified as a human face image; if the main portion of the image is a person, it may be classified as a human image; and if the main portion of the image is a building, it may be classified as a building image, and so on. Often, people shows a great intention to make the human face image and the human image colorful, therefore, the embodiments of the disclosure would be described by taking colorizing grayscale images of a human face image and a human image as examples.

At step 103, providing the grayscale image to a neural network based image colorizing model corresponding to the type of the grayscale image, to obtain color information for respective pixels in the grayscale image.

In case the grayscale image is a human face image, the grayscale image is provided to a neural network based human face image colorizing model to obtain color information for respective pixels in the grayscale image. If the grayscale image represents a human image, the grayscale image is provided to a neural network based human image colorizing model to obtain color information for respective pixels in the grayscale image.

By classifying and determining the types of grayscale images, different types of grayscale images would be processed with different image colorizing models based on neural network. In this way, each image colorizing model only needs to be trained for one type of image samples during model training, resulting in a high accuracy and low complexity of the model. So a faster processing speed can be achieved when colorizing the images.

At step 104, synthesizing the grayscale image and the color information to obtain a color image.

Based on the provided grayscale image, the image colorizing model employed in the embodiment of the disclosure may generate color information for respective pixels of the grayscale image. On this basis, it is only necessary to synthesize a grayscale value of each pixel of the grayscale image and the color information so as to obtain a color image. Such an image colorizing process is simple.

In the embodiment of the disclosure, colorizing the grayscale image is accomplished by classifying the grayscale image to be colorized, and then providing the grayscale image to a corresponding image colorizing model according to the type of the grayscale image to obtain corresponding color information, and synthesizing the grayscale image and the color information. Since the differences in the overall color and profile between different types of grayscale images are great, different colorizing models are employed for colorizing the grayscale images. Hence, each of the colorizing models only needs to be trained with image samples of a corresponding type, which reduces the complexity of the model while enhance the accuracy of the model, thereby accelerating the training speed of the model and the subsequent colorizing process for the grayscale image. Furthermore, the color image obtained by colorizing is closer to a real image.

Figure 2:
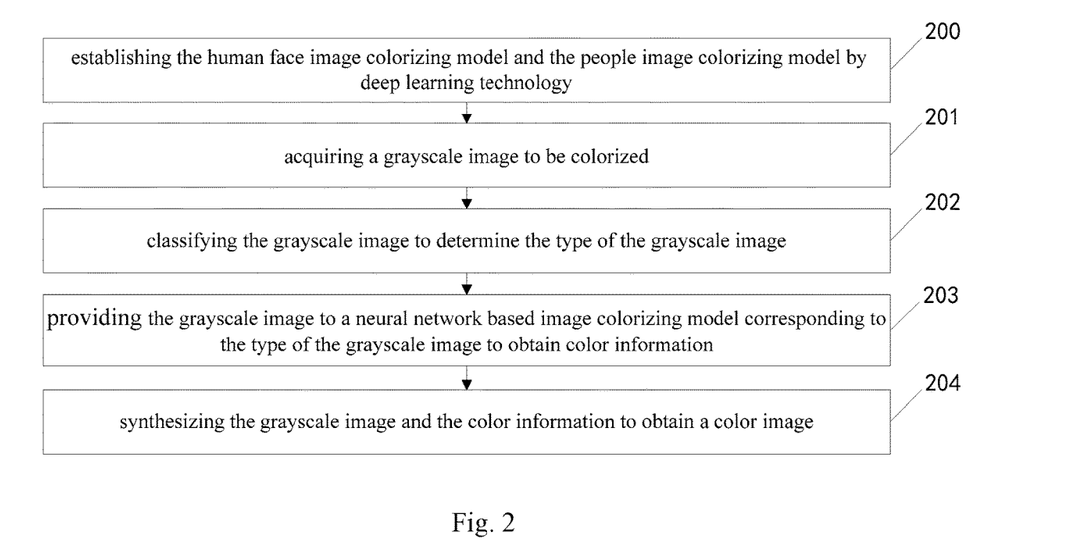
FIG. 2 is a flow chart of an image colorizing method provided by another embodiment of the disclosure.

FIG. 2 is a flow chart of an image colorizing method provided by another embodiment of the disclosure. As shown in FIG. 2, the image colorizing method includes the following steps.

At step 200, establishing the human face image colorizing model or the human image colorizing model utilizing the grayscale image based on deep learning technology.

In some embodiments, the mentioned deep learning technology may utilize deep convolutional generative adversarial network (DCGAN) known to a person having an ordinary skill in the art, for which a model needs to be defined in advance before training, i.e., defining the input, the output and the structure of a neural network. In the embodiments of the disclosure, the input of the model is the grayscale image, and the output thereof is the color information.

In the following, a process of establishing the image colorizing model will be described in connection with FIG. 3 taking the a human face image colorizing model as an example.

Figure 3:
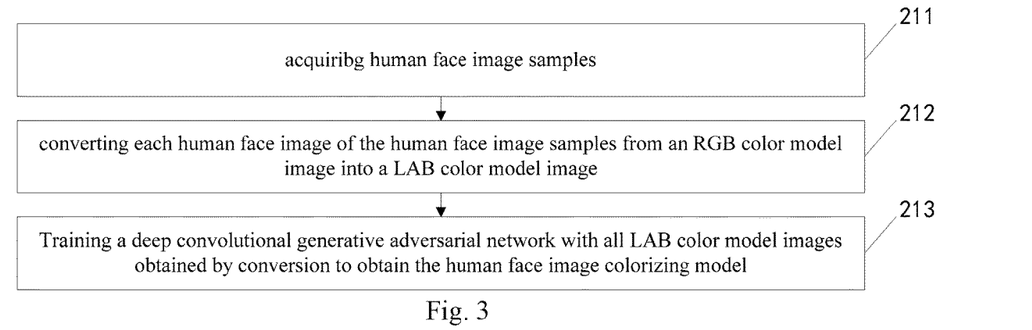
FIG. 3 is a flow chart of a method for establishing a human face image colorizing model provided by an embodiment of the disclosure.

FIG. 3 is a flow chart of a method for establishing a human face image colorizing model provided by an embodiment of the disclosure. Referring to FIG. 3, establishing a human face image colorizing model by means of the deep learning technology may include the following steps.

Step 211, acquiring human face image samples; step 212, converting each human face image of the human face image samples from an R(Red) G(Green) B(Blue) color model image into a LAB color model image; and step 213, training the deep convolutional generative adversarial network with all the LAB color model images obtained by the conversion to obtain the human face image colorizing model.

In some embodiments, a human face image refers to an image that comprises only one human face and where the size of the only one human face (in particular, the proportion of the human face in the overall image) exceeds a set value (e.g., 50%). An image containing a human face other than the human face image is defined as a human image.

In the training process, first, a human face image is converted from an RGB color model image into a LAB color model image. For the LAB color model image, a L channel is consistent with a single channel of the grayscale image, while an A channel and a B channel represent the color information of the image. So, the process of colorizing a grayscale image may be considered as comprising a process of generating the A and B channels as an output from the L channel as an input. Utilizing LAB color model images to train the deep convolutional generative adversarial network may result in a model of generating the data of the A and B channels from the data of the L channel, i.e., the human face image colorizing model. Training a common deep convolutional generative adversarial network can obtain a fine human face image colorizing model, which model is low in richness of color and adapted for colorizing a human face image.

In the LAB color model, the color information and the intensity information are separate from each other, whereas they are usually mixed together in the RGB color model. Therefore, by synthesizing the grayscale image and the color information into a LAB color model image, and then converting the LAB color model image into an RGB color model image, addition of the color information may be achieved without changing the intensity information of the original grayscale image.

For the LAB color model, "L" represents the luminosity, which is the same as the grayscale in a grayscale image, "A" represents a color range from magenta to green, and "B" represents a color range from yellow to blue.

In some embodiments, establishing a human face image colorizing model by the deep learning technology further includes: normalizing each human face image of the human face image samples prior to converting each human face image of the human face image samples from an RGB color model image into a LAB color model image.

The human face image colorizing model is obtained by training a deep convolutional generative adversarial network, which is very sensitive to data. To simplify the training process and accelerate the convergence speed of training, it is possible to normalize the human face images so that identical features are at the same position in the image and it is feasible to capture only a small image region containing a human face from the image.

Further, normalizing each human face image of the human face image samples includes the following steps: locating key parts of the human face in the human face image; and normalizing the sizes of the human face images according to the locations of the key parts, such that the key parts are located at set positions in the normalized human face image.

By means of the normalization process, it may be realized that identical features in different sample images are at the same position in corresponding sample images and only a small image region containing a human face is required to be captured, which facilitates that the normalized sample images have low complexity, and the training process for the human face images is simple, thereby guaranteeing the accuracy of the model obtained by training.

In some embodiments, the key parts of the human face image may include the two eyes, the tip of nose, the corners of mouth, etc. It may be possible to set e.g. the position of the tip of nose at a region in the center of the image while ensuring other key parts are in corresponding desired regions. Afterwards, normalize the sizes of the human face images, such that all human face images in the human face image samples have the same size.

In some embodiments, the human face images in the human face image samples are those of the same human race. The deep convolutional generative adversarial network is trained based on human face images of different human races, to obtain image colorizing models corresponding to human face images of different human races, and then in a subsequent process of colorizing the human face images, different image colorizing models can be utilized depending on e.g. black and white pictures of a different human races, thus resulting in a higher accuracy in colorizing. For example, in the process of colorizing, a user instruction may be received, and an image colorizing model for a corresponding human race is selected according to the user instruction for colorizing a grayscale image.

Figure 4:
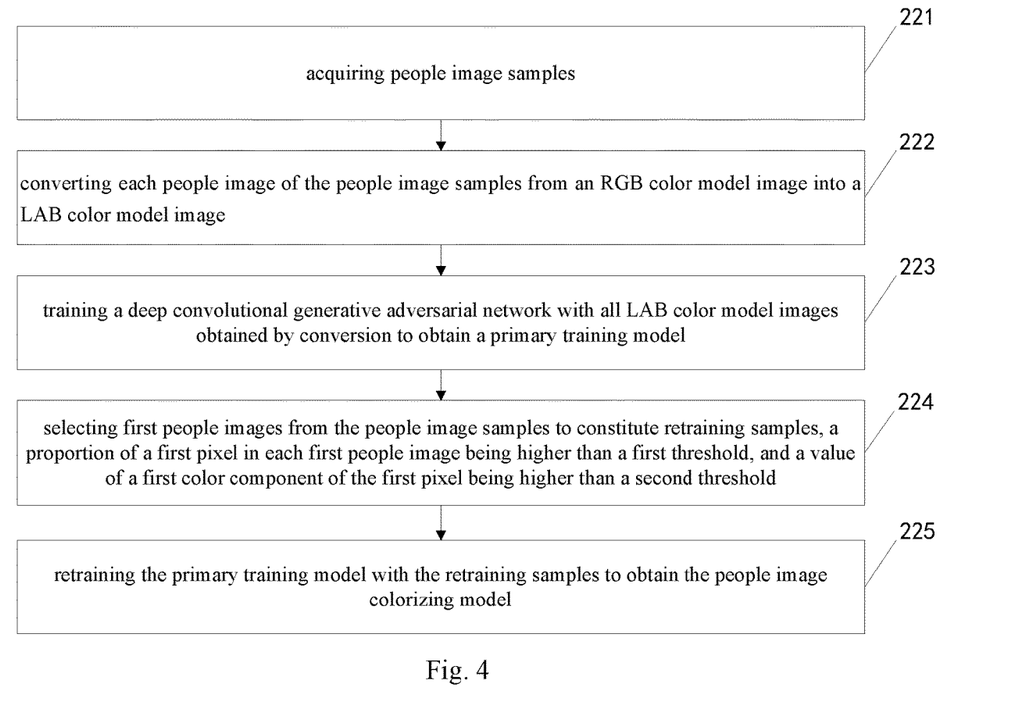
FIG. 4 is a flow chart of a method for establishing a human image colorizing model provided by another embodiment of the disclosure.

FIG. 4 is a flow chart of a method for establishing a human image colorizing model provided by another embodiment of the disclosure. Referring to FIG. 4, establishing the human image colorizing model by the deep learning technology includes the following steps. Step 221, acquiring human image samples, step 222, converting each human image of the human image samples from an RGB color model image into a LAB color model image; step 223, training a deep convolutional generative adversarial network with all the LAB color model images obtained by conversion to obtain a primary training model; step 224, selecting first human image s from the human image samples to constitute retraining samples, the proportion of first pixels in the first human image s being in a first range, and the first pixels refer to pixels for which the values of particular color components are in a second range; and step 225, retraining the primary training model with the retraining samples to obtain the human image colorizing model.

First, a human image is converted from an RGB color model image into a LAB color model image. For the LAB color model image, an L channel is consistent with a single channel of the grayscale image, and an A channel and a B channel represent the color information of the image. Therefore, colorizing the grayscale image may be deemed as comprising a process of obtaining the A channel and B channel as the output from the L channel as the input. Utilizing the LAB color model images to train the deep convolutional generative adversarial network may get a model of generating the data of the A channel and B channel from the data of the L channel, that is, the primary training model. Since the training samples are acquired in an uncontrolled environment and have a high complexity, model training needs to take a relatively long time and the convergence speed is slow. Color features synthesized by the trained model are determined by the training samples, what is obtained is generally a model rich in color. However, there is a large difference in vision between an image colorized by using such a model and a real image, that is, it is too rich in color. On this basis, to obtain a color image close to the reality, in an embodiment of the disclosure, features of training samples would be controlled. For example, reducing the color types in the samples, rescreening the samples, the retained image samples are taken as new training samples to continue training the model. That is, some images that have relatively uniform colors are selected from the training samples to continue training the model. Since the retaining samples are of roughly uniform colors, the model would converge more easily. For example, the first human image s may be selected from the human image samples to constitute retraining samples, the proportion of first pixels in the first human image s being higher than a first threshold, and the value of a first color component in the first pixels being higher than a second threshold. Thus, retraining samples with roughly uniform colors may be obtained.

Further, in the training process, it may further be possible to select images with same features for training, for example, selecting human image s with the same sex, the same age group and the same trappings for training, which reduces the complexity of the samples.

Further, in an embodiment of the disclosure, when performing training to get the human image colorizing model, it may also be possible to firstly normalize the human image s, that is, establishing the human image colorizing model by the deep learning technology further includes normalizing each human image of the human image samples prior to converting each human image of the human image samples from an RGB color model image into a LAB color model image. The specific processing procedure may be similar to that of the human face image, and the differences may lie in selection of the key parts, the set positions of the key parts and the image sizes. In some embodiments, the normalized human image is made to retain more regions, for example, upper body clothing, the background scene, etc.

Similarly, in some embodiments, the human image s in the human image samples are those of the same human race. Training the deep convolutional generative adversarial network based on human image s of different human races may generate human image colorizing models corresponding to different human races, then in a subsequent process of colorizing the human image s, a higher colorizing accuracy may be achieved by using a different image colorizing models depending on e.g. black and white pictures of different human faces.

In the embodiments of the disclosure, when acquiring the human face image samples and the human image samples, it may be possible to utilize a human face detection technology to select images containing a human face from a sample library, and the images containing a human face are classified just like in the previously mentioned step 202 to form the human face image samples and the human image samples. For example, the human face detection may be accomplished by the human face detection tool that comes with a computer vision library OPEN CV.

In the above, embodiments of a method or process of establishing the human face image colorizing model and the human image colorizing model are introduced by way of examples, next, return to FIG. 2 to continue to describe the flow chart of the image colorizing method as shown in FIG. 2.

At step 201, acquiring a grayscale image to be colorized. That is, a grayscale image that is to be colorized is acquired. The grayscale image may be an image corresponding to a black and white picture, or it may be a grayscale image generated in other ways, which will not be limited herein.

At step 202, classifying the grayscale image and determining the type of the grayscale image.

Since most black and white pictures are human face images and human image s, and users usually have a great intention to colorize the human face images and human image s, the schemes for colorizing the grayscale images of this disclosure are illustrated with respect to human face images and human image s.

In an embodiment of the disclosure, the step 202 may include determining the grayscale image is a human face image or a human image according to the number and sizes of human faces in the grayscale image.

In some embodiments, the step of determining the grayscale image is a human face image or a human image according to the number and sizes of human faces in the grayscale image comprises: detecting the number and sizes of human faces in the grayscale image; determining the grayscale image is a human face image if there is only one human face in the grayscale image and the proportion of the human face in the grayscale image exceeds a threshold value; and determining that the grayscale image is a human face image if there are at least two human faces in the grayscale image, or the proportion of the human face in the grayscale image does not exceed the threshold value.

For the human face image in this embodiment, there is only one human face and the proportion of the human face is required to exceed a certain value, it is easy to determine whether the grayscale image to be colorized is a human face image or a human image by detecting the number and sizes of human faces in the image.

At step 203, providing the grayscale image to a neural network based image colorizing model corresponding to the type of the grayscale image to obtain color information for respective pixels in the grayscale image.

When the grayscale image is a human face image, the grayscale image is provided to a neural network based human face image colorizing model to obtain color information for respective pixels in the grayscale image. In case the grayscale image is a human image, the grayscale image is provided to a neural network based human image colorizing model to obtain color information for respective pixels in the grayscale image.

During step 202 and step 203, the grayscale images are classified into human face images and human image s, as human face images and human image s are relatively common in black and white pictures and people has great intention to colorize them. Further, since the proportion of a human face is different in a human face image from in a human image, which results in large differences in the overall color and profile, two colorizing models are employed for colorizing, which reduces the complexity of the model and causes the color image obtained by colorizing is closer to a real image.

At step 204, the grayscale image and the color information are synthesized to obtain a color image.

In an embodiment of the disclosure, the step 204 may comprise synthesizing the grayscale image and the color information into a LAB color model image; and converting the LAB color model image into an RGB color model image.

In the above embodiment, the data of the A channel and the B channel is used as the color information outputted by the image colorizing model, the color information and the grayscale image are synthesized into a LAB color model image, and then the LAB color model image is converted into an RGB color model image, thereby facilitating displaying and storing the synthesized color image.

In particular, the color information includes data of the A channel and the B channel for each pixel in the grayscale image, and the grayscale values of respective pixels of the grayscale image and the data of the A channel and the B channel for respective pixels in the grayscale image are synthesized, thereby obtaining the LAB color model image.

Figure 5:
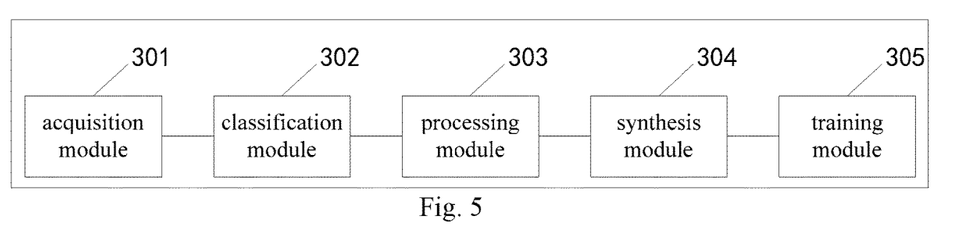
FIG. 5 is a schematic view of an image colorizing device provided by still another embodiment of the disclosure.

FIG. 5 is a schematic view of an image colorizing device provided by an embodiment of the disclosure, which device is configured to performing an image colorizing method as shown in FIGS. 1-4. Referring to FIG. 5, the image colorizing device includes an acquisition module 301, a classification module 302, a processing module 303 and a synthesis module 304.

The acquisition module 301 is configured to acquire a grayscale image to be colorized, the classification module 302 is configured to classify the grayscale image to determine that the grayscale image is a human face image or a human image; the processing module 303 is configured to provide the grayscale image to a neural network based image colorizing models corresponding to the type of the grayscale image to obtain color information for respective pixels in the grayscale image, the image colorizing models comprising a human face image colorizing model corresponding to the human face image or a human image colorizing model corresponding to the human image; and the synthesis module 304 is configured to synthesize the grayscale image and the color information to obtain a color image.

In some embodiments, the acquisition module may include an image capturing or scanning device, to acquire a grayscale image of, for example, a picture. The classification module may receive information of the grayscale image, and based on the forgoing definition of a human face image or a human image, recognize a human face image or a human image from the grayscale image. The processing module may receive the grayscale image, and provide it to the human face image colorizing model and the human image colorizing model established previously, and the human face image colorizing model or the human image colorizing model outputs color information for respective pixels in the grayscale image. The processing module and the synthesis module may be implemented in software. Since the previously established human face image colorizing model and human image colorizing model automatically generate the color information based on the information of the grayscale image, the color information for respective pixels of the grayscale image may be outputted when they are provided with the information of the gray scale image.

In the embodiments of the disclosure, colorizing the human image is accomplished by classifying a grayscale image to be colorized, providing the grayscale image to a corresponding image colorizing model to obtain corresponding color information, and then synthesizing the grayscale image and the color information to obtain a color image. Since different types of grayscale image differ greatly in the overall color and profile, different image colorizing models are employed for colorizing, and each of the image colorizing models only needs to trained with image samples of a corresponding type, which reduces the complexity of the model, results in a high accuracy of the model, thereby accelerating the training speed of the model and the speed of colorizing the grayscale image. Furthermore, the color image obtained by colorizing is closer to a real image.

In an embodiment of the disclosure, the classification module 302 is configured to determine whether the grayscale image is a human face image or a human image according to the number and sizes of human faces in the grayscale image.

Accordingly, the processing module 303 is configured to provide the grayscale image to a neural network based image colorizing model corresponding to the type of the grayscale image to obtain color information for respective pixels in the grayscale image. The image colorizing models include a human face image colorizing model corresponding to the human face image or a human image colorizing model corresponding to the human image.

In some embodiments, the classification module 302 is configured to detect the number and sizes of human faces in the grayscale image. When there is only one human face in the grayscale image and the proportion of the human face in the grayscale image exceeds a threshold value, it is judged that the grayscale image is a human face image. If there are at least two human faces in the grayscale image, or the proportion of the human face in the grayscale image does not exceed the threshold value, it is judged that the grayscale image is a human image.

In an embodiment of the disclosure, the synthesis module 304 is configured to synthesize the grayscale image and the color information into a LAB color model image, which then is converted into an RGB color model image.

In some embodiments, the image colorizing device may further include a training module 305 configured to establish the human face image colorizing model or the human image colorizing model utilizing the grayscale image based on a deep learning technology.

The training module 305 may receive acquired human face image samples, convert each human face image of the human face image samples into a LAB color model image. A deep convolutional generative adversarial network is trained with all the LAB color model images obtained by conversion to obtain the human face image colorizing model.

Further, the training module 305 is further configured to normalize each human face image of the human face image samples prior to converting it into a LAB color model image.

For example, the training module 305 may locate key parts of the human face in the human face image, and normalize the size of the human face image according to the positions of the key parts, such that the key parts are located at desired positions in the normalized human face image.

In some embodiments, the human face images of the human face image samples may be those of the same human race.

When establishing the human image colorizing model, the training module 305 may receive human image samples, and convert each human image of the human image samples into a LAB color model image. The LAB color model images obtained by conversion are used to train a deep convolutional generative adversarial network to obtain a primary training model. First human image s in the human image samples are selected to constitute retraining samples, the proportion of first pixels in each first human image being in a first range, and the first pixel refers to a pixel for which a particular color component value is in a second range. The primary training model is retrained with the retraining samples to obtain the human image colorizing model.

The image colorizing devices provided herein have only been illustrated with examples where the image colorizing device comprises different functional modules. In a practical application, the described functions may be accomplished by different functional modules as needed, namely, the internal structure of the device may be divided in different ways to get different functional modules to carry out all or part of the functions described above. In addition, the image colorizing device provided by the embodiments and the embodiments of image colorizing method have the same inventive concept, and specific implementation of the image colorizing device may refer to the method embodiments, which will not be repeated herein.

The person having an ordinary skill in the art can appreciate that all or part of the steps of the above embodiments may be accomplished by hardware, or accomplished by hardware combined with a program. The program may be stored in a computer readable storage medium, which may be a read-only memory, a magnetic disk or a compact disc, etc.

What have been stated above are some embodiments of the disclosure, and are not intended to limit the scope of the application. Any modifications, equivalent substitutions, improvements to the embodiments within the spirit and principles of the disclosure should be encompassed in the protection scope of the application.

The invention claimed is:

1. An image colorizing method comprising:
   acquiring a grayscale image to be colorized;
   classifying the grayscale image to determine a type of the grayscale image, the type of the grayscale image comprising a human face image or a human image;
   providing the grayscale image to a neural network based image colorizing model corresponding to the type of the grayscale image to obtain color information for respective pixels of the grayscale image, wherein the image colorizing model comprises a human face image colorizing model corresponding to the human face image or a human image colorizing model corresponding to the human image; and
   synthesizing the grayscale image and the color information to obtain a color image,
   wherein the classifying the grayscale image to determine the type of the grayscale image comprises:
      detecting a number and sizes of human faces in the grayscale image;
      determining that the grayscale image is the human face image when one human face is present in the grayscale image and a proportion of the human face in the grayscale image exceeds a threshold value; and
      determining that the grayscale image is the human image when the proportion of the human face in the grayscale image does not exceed the threshold value or at least two human faces are present in the grayscale image.

2. The image colorizing method as claimed in claim 1, wherein the synthesizing the grayscale image and the color information to obtain the color image comprises:
   synthesizing the grayscale image and the color information into a LAB color model image; and
   converting the LAB color model image into an RGB color model image.

3. The image colorizing method as claimed in claim 1, wherein the image colorizing method further comprises:
   establishing the human face image colorizing model or the human image colorizing model utilizing the grayscale image based on a deep learning technology.

4. The image colorizing method as claimed in claim 3, wherein the establishing the human face image colorizing model utilizing the grayscale image based on the deep learning technology comprises:
   acquiring human face image samples;
   converting the human face image of the human face image samples from an RGB color model image into a LAB color model image; and
   training a deep convolutional generative adversarial network with the LAB color model image obtained by the converting to obtain the human face image colorizing model.

5. The image colorizing method as claimed in claim 4, wherein the establishing the human face image colorizing model utilizing the grayscale image based on the deep learning technology further comprises:
   normalizing the human face image of the human face image samples prior to converting the human face image of the human face image samples from the RGB color model image into the LAB color model image.

6. The image colorizing method as claimed in claim 5, wherein the normalizing the human face image of the human face image samples comprises:
   identifying key parts of the human face in the human face image; and normalizing a size of the human face image according to the key parts, such that the key parts are at set positions in a normalized human face image.

7. The image colorizing method as claimed in claim 4, wherein the human face images of the human face image samples are those of a same human race.

8. An image colorizing method comprising:
acquiring a grayscale image to be colorized;
classifying the grayscale image to determine a type of the grayscale image, the type of the grayscale image comprising a human face image or a human image;
providing the grayscale image to a neural network based image colorizing model corresponding to the type of the grayscale image to obtain color information for respective pixels of the grayscale image, wherein the image colorizing model comprises a human face image colorizing model corresponding to the human face image or a human image colorizing model corresponding to the human image;
synthesizing the grayscale image and the color information to obtain a color image; and
establishing the human face image colorizing model or the human image colorizing model utilizing the grayscale image based on a deep learning technology,
wherein the establishing the human image colorizing model utilizing the grayscale image based on the deep learning technology comprises:
acquiring human image samples;
converting the human image of the human image samples from an RGB color model image into a LAB color model image;
training a deep convolutional generative adversarial network with the LAB color model image obtained by the converting to obtain a primary training model;
selecting first human images from the human image samples as retraining samples, wherein a proportion of a first pixel in each of the first human images is higher than a first threshold, and wherein a value of a first color component of the first pixel is higher than a second threshold; and
retraining the primary training model with the retraining samples to obtain the human image colorizing model.

9. An image colorizing device comprising:
an acquisition module configured to acquire a grayscale image to be colorized;
a classification module configured to classify the grayscale image to determine a type of the grayscale image, the type of the grayscale image comprising a human face image or a human image;
a processing module configured to provide the grayscale image to a neural network based image colorizing model corresponding to the type of the grayscale image to obtain color information for respective pixels of the grayscale image, wherein the image colorizing model comprises a human face image colorizing model corresponding to the human face image or a human image colorizing model corresponding to the human image, and
a synthesis module configured to synthesize the grayscale image and the color information to obtain a color image,
wherein the classification module is further configured to perform operations comprising:
detecting a number and sizes of human faces in the grayscale image;
determining that the grayscale image is the human face image when one human face is present in the grayscale image and a proportion of the human face in the grayscale image exceeds a threshold value; and
determining that the grayscale image is the human image when the proportion of the human face in the grayscale image does not exceed the threshold value or at least two human faces are present in the grayscale image.

10. The image colorizing device as claimed in claim 9, wherein the synthesis module is configured to synthesize the grayscale image and the color information into a LAB color model image, and convert the LAB color model image into an RGB color model image.

11. The image colorizing device as claimed in claim 9, wherein the image colorizing device further comprises a training module configured to establish the human face image colorizing model or the human image colorizing model utilizing the grayscale image based on a deep learning technology.

12. The image colorizing device as claimed in claim 11, wherein the training module is configured to perform operations comprising:
receiving human face image samples,
converting the human face image of the human face image samples into a LAB color model image, and
training a deep convolutional generative adversarial network with the LAB color model image obtained by the converting to obtain the human face image colorizing model.

13. The image colorizing device as claimed in claim 12, wherein the training module is further configured to normalize the human face image of the human face image samples prior to converting the human face image of the human face image samples into a LAB color model image.

14. The image colorizing device as claimed in claim 13, wherein the training module is further configured to perform operations comprising:
identifying key parts of the human face in the human face image; and
normalizing a size of the human face image according to the key parts, such that the key parts are at set positions in a normalized human face image.

15. The image colorizing device as claimed in claim 12, the human face images of the human face image samples are those of a same human race.

16. The image colorizing device as claimed in claim 11, wherein the training module is configured to perform operations comprising:
receiving human image samples;
converting the human image of the human image samples into a LAB color model image;
training a deep convolutional generative adversarial network with the LAB color model image obtained by the converting to obtain a primary training model;
selecting first human images from the human image samples as retraining samples, wherein a proportion of a first pixel in each of the first human images is higher than a first threshold, and wherein a value of a first color component of the first pixel is higher than a second threshold; and
retraining the primary training model with the retraining samples to obtain the human image colorizing model.

* * * * *